(12) United States Patent
Hong et al.

(10) Patent No.: US 10,803,812 B2
(45) Date of Patent: Oct. 13, 2020

(54) DISPLAY DEVICE

(71) Applicant: Samsung Display Co., Ltd., Yongin-Si, Gyeonggi-Do (KR)

(72) Inventors: Seokha Hong, Seoul (KR); Nam-gon Choi, Yongin-si (KR); Moonshik Kang, Hwaseong-si (KR); Jaehoon Lee, Seoul (KR); Kyoungho Lim, Suwon-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 38 days.

(21) Appl. No.: 16/120,607

(22) Filed: Sep. 4, 2018

(65) Prior Publication Data

US 2019/0073964 A1  Mar. 7, 2019

(30) Foreign Application Priority Data

Sep. 4, 2017 (KR) ........................ 10-2017-0112812

(51) Int. Cl.
| | |
|---|---|
| *G09G 3/34* | (2006.01) |
| *G02F 1/13357* | (2006.01) |
| *G02F 1/1335* | (2006.01) |
| *G09G 3/36* | (2006.01) |

(52) U.S. Cl.
CPC ........... *G09G 3/342* (2013.01); *G02F 1/1336* (2013.01); *G09G 3/3413* (2013.01); *G02F 1/133514* (2013.01); *G02F 2001/133601* (2013.01); *G02F 2201/58* (2013.01); *G09G 3/3677* (2013.01); *G09G 3/3688* (2013.01); *G09G 2320/066* (2013.01); *G09G 2320/0646* (2013.01); *G09G 2320/0673* (2013.01); *G09G 2320/0686* (2013.01); *G09G 2354/00* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 8,520,032 B2 | 8/2013 | Ahn | |
| 9,576,538 B2 | 2/2017 | Baek et al. | |
| 2009/0295708 A1* | 12/2009 | Yamashita | ............ G01J 1/4204 345/102 |
| 2017/0098426 A1 | 4/2017 | Won et al. | |

FOREIGN PATENT DOCUMENTS

| | | |
|---|---|---|
| KR | 1020060076472 A | 7/2006 |
| KR | 1020150030555 A | 3/2015 |
| KR | 101604482 B1 | 3/2016 |
| KR | 101730329 B1 | 4/2017 |
| KR | 1020170039783 A | 4/2017 |

\* cited by examiner

*Primary Examiner* — Nicholas J Lee
(74) *Attorney, Agent, or Firm* — Cantor Colburn LLP

(57) ABSTRACT

A display device includes a display panel, a plurality of sensors, a signal control unit, and a backlight unit. A plurality of dimming regions is defined in the display panel. The signal control unit determines a plurality of representative luminance values corresponding to the plurality of dimming regions based on image data signals received from an external device and illuminance values of an external light measured by the plurality of sensors. The backlight unit provides lights having the representative luminance values to the display panel.

20 Claims, 15 Drawing Sheets

FIG. 3A

| DM1 | DM2 | DM3 | DM4 |
|-----|-----|-----|-----|
| DM5 | DM6 | DM7 | DM8 |
| DM9 | DM10 | DM11 | DM12 |

| LB1 | LB2 | LB3 | LB4 |
|-----|-----|-----|-----|
| LB5 | LB6 | LB7 | LB8 |
| LB9 | LB10 | LB11 | LB12 |

DISPLAY DEVICE

This application claims priority to Korean Patent Application No. 10-2017-0112812, filed on Sep. 4, 2017, and all the benefits accruing therefrom under 35 U.S.C. § 119, the content of which in its entirety is herein incorporated by reference.

BACKGROUND

The invention relates to a display device in which a backlight unit with a local dimming function is provided, and in particular, a display device configured to realize a high image quality even when an external light is incident thereon.

A liquid crystal display device generally includes a display panel, which is configured to display an image using a change in optical transmittance of a liquid crystal layer, and a backlight unit, which is placed below the display panel to provide light to the display panel. The backlight unit includes a light source that is configured to generate the light required to display an image on the display panel.

A local dimming method was developed to prevent a reduction in a contrast ratio ("CR") of an image and minimize power consumption. In local dimming method, the light source is divided into a plurality of light-emitting blocks, and a light amount of each of the light-emitting blocks is controlled based on luminance of a corresponding portion of an image.

SUMMARY

Some exemplary embodiments of the inventive concept provide a display device, which is configured to perform a local dimming operation, based on image data of an image to be displayed on a display device and information on illuminance of an external light to be incident into the display device.

According to some exemplary embodiments of the inventive concept, a display device includes a display panel in which a plurality of dimming regions is defined, a plurality of sensors at different positions, each of which measures illuminance of an external light incident on the display panel, a signal control unit which determines a plurality of representative luminance values corresponding to the plurality of dimming regions based on image data signals transmitted from an external device and external light map signals generated based on the measured illuminance of the external light, and generates a plurality of dimming signals corresponding to the plurality of representative luminance values, a light source driving unit which receives the plurality of dimming signals and outputs a plurality of driving signals corresponding to the plurality of dimming signals received, and a backlight unit which receives the plurality of driving signals and comprises a plurality of light source blocks which provides lights having the corresponding representative luminance values to the plurality of dimming regions.

In some exemplary embodiments, the plurality of sensors may include a first sensor disposed at a position corresponding to a left top region of the display panel, a second sensor disposed at a position corresponding to a right top region of the display panel, a third sensor disposed at a position corresponding to a left bottom region of the display panel, and a fourth sensor disposed at a position corresponding to a right bottom region of the display panel.

In some exemplary embodiments, a value of the external light map signal, which is used to determine the representative luminance value corresponding to the dimming region defined in a top region of the display panel, may be determined based on a relative position of the corresponding dimming region with respect to the positions of the first and second sensors such that the value changes in proportion to a difference between illuminances measured by the first and second sensors, and a value of the external light map signal, which is used to determine the representative luminance value corresponding to the dimming region defined in a bottom region of the display panel, may be determined based on a relative position of the corresponding dimming region with respect to the positions of the third and fourth sensors such that the value changes in proportion to a difference between illuminances measured by the third and fourth sensors.

In some exemplary embodiments, a value of the external light map signal, which is used to determine the representative luminance value corresponding to the dimming regions defined in a left region of the display panel, may be determined based on a relative position of the corresponding dimming region with respect to the positions of the first and third sensors such that the value changes in proportion to a difference between illuminances measured by the first and third sensors, and a value of the external light map signal, which is used to determine the representative luminance value corresponding to the dimming region defined in a right region of the display panel, may be determined based on a relative position of the corresponding dimming region with respect to the positions of the second and fourth sensors such that the value changes in proportion to a difference between illuminances measured by the second and fourth sensors.

In some exemplary embodiments, the plurality of sensors may be disposed to correspond to the plurality of light source blocks, respectively. Each of the external light map signals may be changed depending on illuminance of the external light measured by a corresponding one of the plurality of sensors.

In some exemplary embodiments, when a gradation value obtained from the image data signals is less than a predetermined value, the signal control unit may further determine sub-representative luminance values based only on the received image data signals, and each of the sub-representative luminance values may be determined to be smaller than the representative luminance value.

In some exemplary embodiments, when a gradation value obtained from the image data signals is less than the predetermined value, the signal control unit may increase a gamma value of the received image data signal.

In some exemplary embodiments, when a gradation value obtained from the image data signals is less than a predetermined value, the signal control unit may emphasize blue-color signals in the image data signals.

In some exemplary embodiments, the display device may further include a memory, which stores a lookup table containing information regarding a change in pupil size of a human eye which occurs when there is a change in illuminance.

In some exemplary embodiments, the display device may receive a user illuminance signal, in which information on neighboring illuminance is contained, from an external device around a user, obtain a pupil size value corresponding to the received user illuminance signal from the lookup table in the memory, and determine the representative luminance value based on the obtained pupil size value.

In some exemplary embodiments, the external device may be a remote controller with a sensor and the sensor of the remote controller may measure illuminance of light incident thereon.

In some exemplary embodiments, the display panel may include a plurality of pixels, and the plurality of sensors may be disposed on the display panel to be adjacent to some of the plurality of pixels.

In some exemplary embodiments, the backlight unit may provide blue color lights to the display panel, and the display panel may further include a color filter layer on which the blue color lights provided from the backlight unit is incident. The color filter layer may include a red coloring part including a red color filter, a green coloring part including a green color filter, and a blue coloring part, in which an opening is defined.

According to some exemplary embodiments of the inventive concept, a display device includes a display panel which includes a plurality of pixels, a plurality of sensors provided adjacent to the display panel and which measures illuminance of an external light incident thereon and outputs illuminance data signals, a signal control unit which extracts a plurality of gradation values from image data signals received by an external device, extracts external light indices from the illuminance data signals, calculates representative luminance values, and generates a plurality of dimming signals corresponding to the representative luminance value, each of the representative luminance values being obtained based on mean and maximum values of the extracted gradation values and the extracted external light indices, and a backlight unit which includes a plurality of light source blocks, receives a plurality of driving signals corresponding to the plurality of dimming signals and provides light to the display panel, where each of the light source blocks emits light having a corresponding one of the plurality of representative luminance values.

In some exemplary embodiments, the plurality of sensors may include a first sensor disposed adjacent to a left top region of the display panel, a second sensor disposed adjacent to a right top region of the display panel, a third sensor disposed adjacent to a left bottom region of the display panel, and a fourth sensor disposed adjacent to a right bottom region of the display panel.

In some exemplary embodiments, the external light index, which is used to calculate the representative luminance value corresponding to the light source block providing light to a top region of the display panel, may be determined based on a relative position of the corresponding dimming region with respect to the positions of the first and second sensors such that the value changes in proportion to a difference between illuminances measured by the first and second sensors, and the external light index, which is used to calculate some of the representative luminance value corresponding to the light source block providing light to a bottom region of the display panel, may be determined based on a relative position of the corresponding dimming region with respect to the positions of the third and fourth sensors such that the value changes in proportion to a difference between illuminances measured by the third and fourth sensors. The external light index, which is used to calculate the representative luminance value corresponding to the light source block providing light to a left region of the display panel, may be determined based on a relative position of the corresponding dimming region with respect to the positions of the first and third sensors such that the value changes in proportion to a difference between illuminances measured by the first and third sensors, and the external light index, which is used to calculate the representative luminance value corresponding to the light source block providing light to a right region of the display panel, may be determined based on a relative position of the corresponding dimming region with respect to the positions of the second and fourth sensors such that the value changes in proportion to a difference between illuminances measured by the second and fourth sensors.

The plurality of sensors may be disposed to correspond to the plurality of light source blocks, respectively.

BRIEF DESCRIPTION OF THE DRAWINGS

Exemplary embodiments will be more clearly understood from the following brief description taken in conjunction with the accompanying drawings. The accompanying drawings represent non-limiting, exemplary embodiments as described herein.

FIG. 3A illustrates an exemplary embodiment of a display panel shown in FIG. 2.

FIG. 3B illustrates an exemplary embodiment of a backlight unit shown in FIG. 2.

Figure 1A:
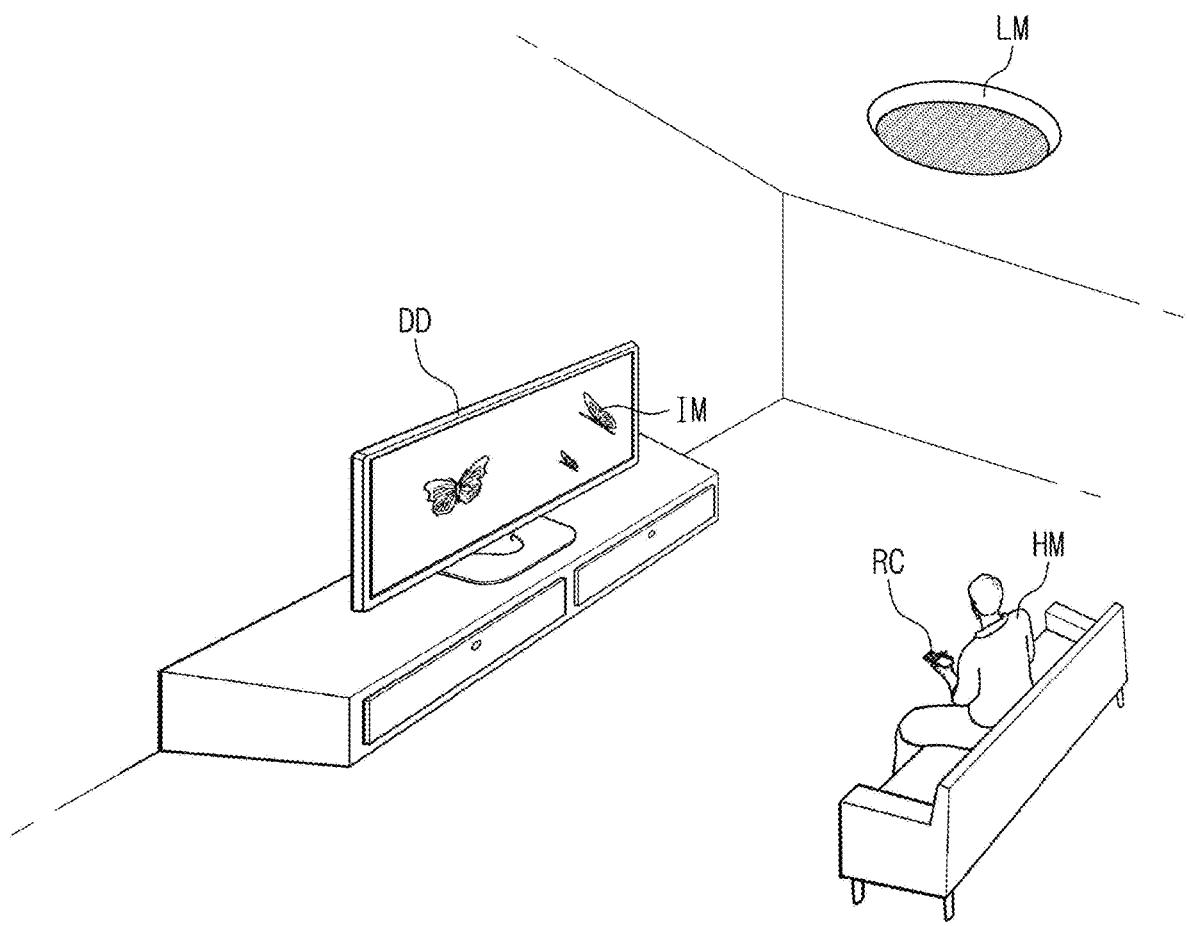
FIG. 1A illustrates an exemplary embodiment of a display device, according to the inventive concept, and an environment in which the display device is used.

It should be noted that these figures are intended to illustrate the general characteristics of methods, structure and/or materials utilized in certain example exemplary embodiments and to supplement the written description provided below. These drawings are not, however, to scale and may not precisely reflect the precise structural or performance characteristics of any given exemplary embodiment, and should not be interpreted as defining or limiting the range of values or properties encompassed by exemplary embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Exemplary embodiments of the inventive concepts will now be described more fully with reference to the accompanying drawings, in which exemplary embodiments are shown. Exemplary embodiments of the inventive concepts may, however, be embodied in many different forms and should not be construed as being limited to the exemplary embodiments set forth herein. Rather, these exemplary embodiments are provided so that this disclosure will be thorough and complete, and will fully convey the concept of exemplary embodiments to those of ordinary skill in the art.

In the drawings, the thicknesses of layers and regions are exaggerated for clarity. Like reference numerals in the drawings denote like elements, and thus their description will be omitted.

The terminology used herein is for the purpose of describing particular exemplary embodiments only and is not intended to be limiting of exemplary embodiments. As used herein, the singular forms "a," "an" and "the" are intended to include the plural forms as well, including "at least one," unless the context clearly indicates otherwise. "At least one" is not to be construed as limiting "a" or "an." It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Figure 1B:
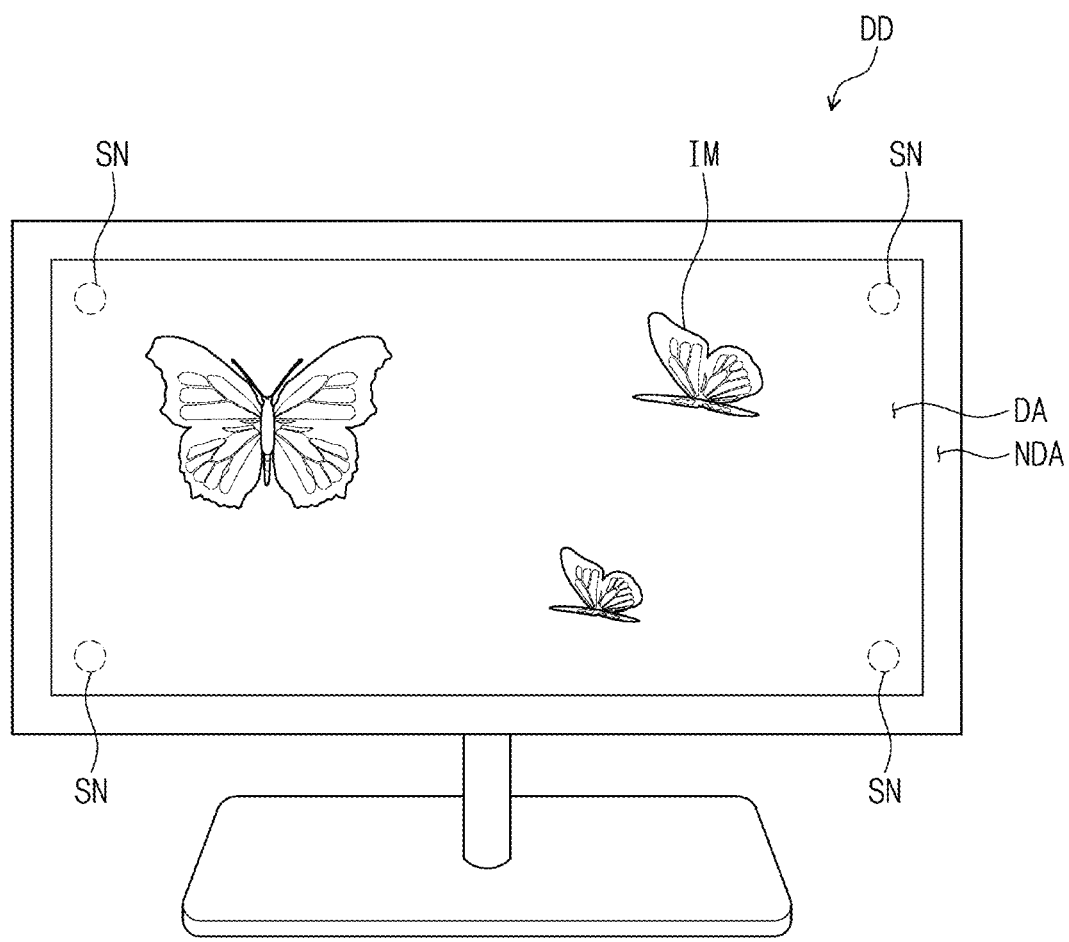
FIGS. 1B and 1C illustrate exemplary embodiments of display devices according to the inventive concept.
Figure 1C:
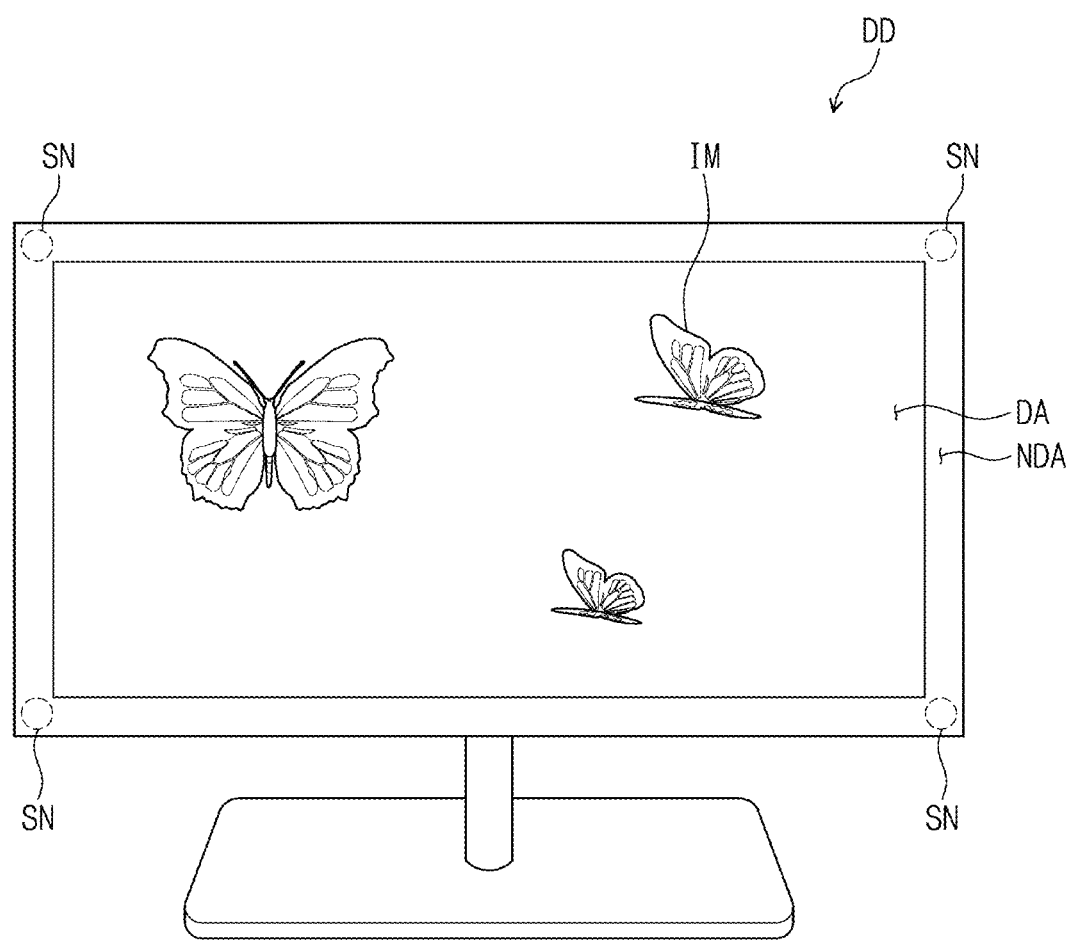

FIG. 1A illustrates an exemplary embodiment of a display device DD according to the inventive concept and an environment in which the display device DD is used. FIGS. 1B and 1C illustrate exemplary embodiments of display devices DD according to the inventive concept.

When a user HM uses the display device DD, an image quality of an image IM to be evaluated by the user HM may be affected by an external light emitted from an external illumination system LM.

For example, in the case where the external illumination system LM is configured to be excessively bright, it may be difficult for the user HM to clearly recognize the image IM. By contrast, in the case where the external illumination system LM is configured to be excessively dark, the image IM may be too bright to look at directly, and thus, the user HM may feel uncomfortable.

That is, the external light from the external illumination system LM may be incident on the display device DD, and this may lead to a change in image quality of the image IM to be evaluated by the user HM.

Illuminance of external light to be incident on each portion of a display region DA of the display device DD may vary depending on a relative position of the illumination system LM. For example, in the case where the illumination system LM is placed above the display device DD, illuminance of external light to be incident on a top portion of the display region DA may be greater than illuminance of external light to be incident on a bottom portion of the display region DA. In the case where the illumination system LM is placed at a right side of the display device DD, illuminance of external light to be incident on a right portion of the display region DA may be greater than illuminance of external light to be incident on a left portion of the display region DA.

The display device DD may include a plurality of sensors SN configured to measure the illuminance of the external light.

The external illumination system LM may affect a pupil size of the user HM and consequently an image quality of the image IM to be evaluated by the user HM.

Since it is difficult to directly measure the pupil size of the user HM, the pupil size of the user HM may be evaluated by measuring illuminance in a neighboring space near the user HM (hereinafter, ambient illuminance).

To measure the ambient illuminance, a device RC near the user HM may be configured to have a sensor for measuring the ambient illuminance. As shown in FIG. 1A, a remote controller may be used as the device RC for measuring the ambient illuminance, but the inventive concept is not limited thereto. In another exemplary embodiment, for example, a portable electronic device such as a smart phone may be used as the device RC for measuring the ambient illuminance. The device RC (e.g., the remote controlled) for measuring the ambient illuminance may be configured to provide related signals (hereinafter, user illuminance signals) containing information on the ambient illuminance to the display device DD, and the display device DD may be configured to receive the user illuminance signals.

Referring to FIG. 1B, the sensors SN for measuring the illuminance of the external light may be provided in the display region DA.

Referring to FIG. 1C, the sensors SN for measuring the illuminance of the external light may be provided in a non-display region NDA.

However, the inventive concept is not limited thereto, and at least one of the sensors SN may be provided in the display region DA and the others may be provided in the non-display region NDA, in another exemplary embodiment.

Figure 2:
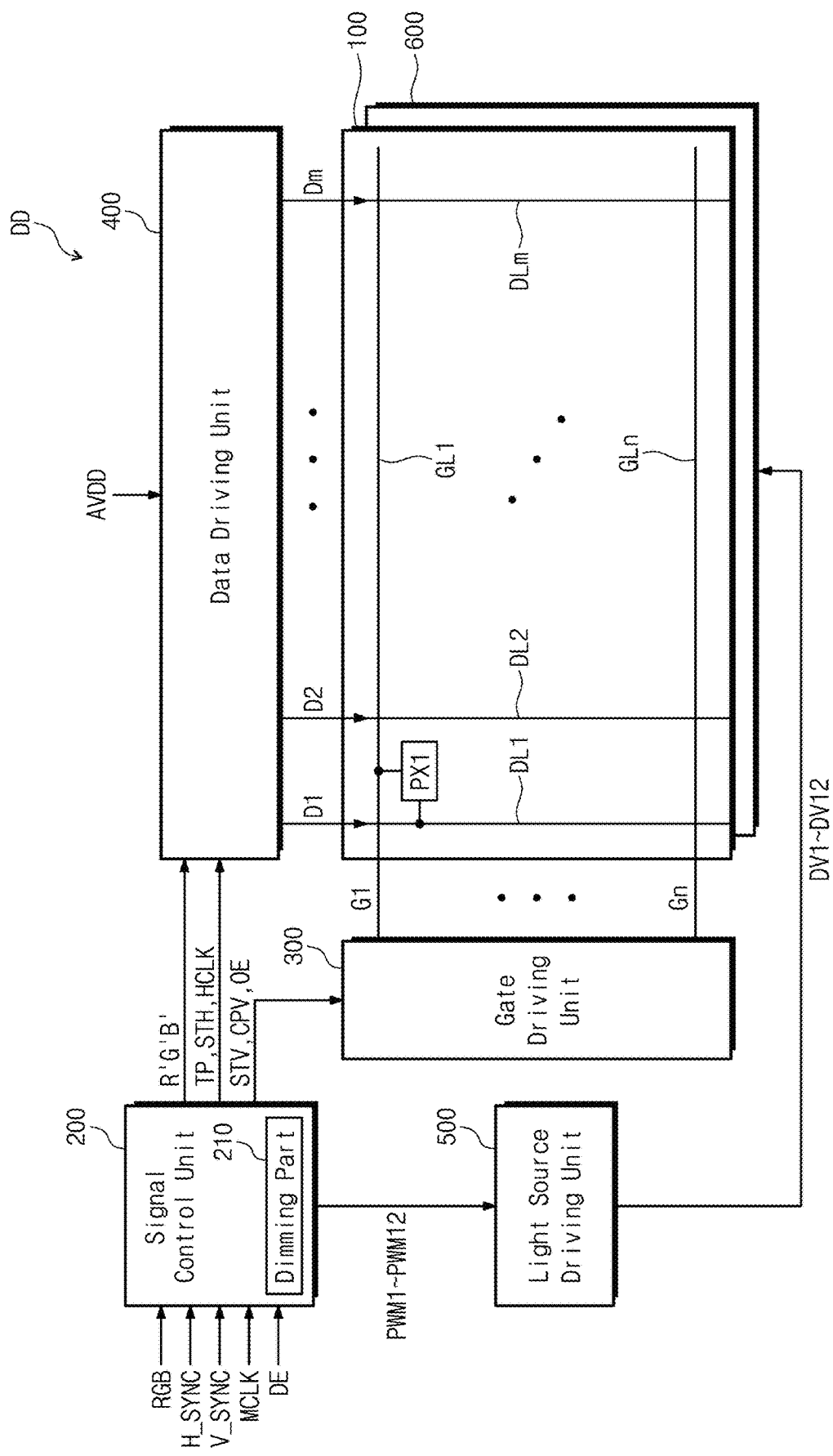
FIG. 2 is a block diagram illustrating an exemplary embodiment of a display device according to the inventive concept.

FIG. 2 is a block diagram illustrating an exemplary embodiment of the display device DD according to the inventive concept. FIG. 3A illustrates an exemplary embodiment of a display panel 100 of FIG. 2. FIG. 3B illustrates an exemplary embodiment of a backlight unit 600 of FIG. 2.

Referring to FIG. 2, the display device DD according to some exemplary embodiments of the inventive concept may include a display panel 100, a signal control unit 200, a gate driving unit 300, a data driving unit 400, a light source driving unit 500, and a backlight unit 600.

The display panel 100 may include a plurality of gate lines GL1 to GLn and a plurality of data lines DL1 to DLm provided to cross the gate lines GL1 to GLn. The gate lines GL1 to GLn may be connected to the gate driving unit 300. The data lines DL1 to DLm may be connected to the data driving unit 400. In order to reduce complexity in the drawings, only some of the gate lines GL1-GLn and some of the data lines DL1-DLm are illustrated in FIG. 2 for explanation purpose. In addition, the display panel 100 may further include at least one dummy gate line (not shown) provided in the non-display region NDA.

A plurality of pixels PX may be provided in the display panel 100, and each of the pixels PX may be connected to a corresponding one of the gate lines GL1 to GLn and a corresponding one of the data lines DL1 to DLm. A specific one of the pixels PX connected to a first gate line GL1 and a first data line DL1 is exemplarily illustrated in FIG. 2 as the pixel PX1.

The pixels PX may be classified into a plurality of groups, depending on their color. Each of the pixels PX may be configured to display one of primary colors. The primary colors may include red, green, blue, and white, but the inventive concept is not limited thereto. In another exemplary embodiment, for example, the primary colors may further include various other colors such as yellow, cyan, and magenta.

The signal control unit 200 may be configured to receive an image data signal RGB, a horizontal synchronization signal H_SYNC, a vertical synchronization signal V_SYNC, a clock signal MCLK, and a data enable signal DE from an external device. The signal control unit 200 may be configured to convert the image data signal RGB into converted image data signals R'G'B', whose data format is suitable for interfacing with the data driving unit 400, and to output the converted image data signals R'G'B' to the data driving unit 400. In addition, the signal control unit 200 may be configured to output data control signals (e.g., an output start signal TP, a horizontal start signal STH, and a clock signal HCLK) to the data driving unit 400 and to output gate control signals (e.g., a vertical start signal STV, a gate clock signal CPV, and an output enable signal OE) to the gate driving unit 300.

The gate driving unit 300 may be configured to receive a gate-on voltage and a gate-off voltage and to sequentially output gate signals G1 to Gn having the gate-on voltage in response to the gate control signals (e.g., STV, CPV, and OE) transmitted from the signal control unit 200. The gate signals G1 to Gn may be sequentially provided to the gate lines GL1 to GLn of the display panel 100 respectively to sequentially scan the gate lines GL1 to GLn. Although not illustrated in the drawings, the display device DD may further include a regulator configured to convert an input voltage into the gate-on voltage and the gate-off voltage and output the converted voltage.

The data driving unit 400 may be operated using an analog driving voltage AVDD input thereto and may be configured to generate a plurality of gradation voltages using gamma voltages which are provided from a gamma voltage generating part (not shown). If the data control signal (e.g., TP, STH, or HCLK) is provided from the signal control unit 200 to the data driving unit 400, gradation voltages corresponding to the converted image data signal R'G'B' may be selected from the generated gradation voltages and then may be provided to the data lines DL1 to DLm of the display panel 100. The selected gradation voltages may serve as data signals D1 to Dm.

If the gate signals G1 to Gn are sequentially provided to the gate lines GL1 to GLn, the data signals D1 to Dm may be provided to the data lines DL1 to DLm in a synchronized manner with the gate signals G1 to Gn.

Referring to FIG. 3A, the display panel 100 may include a plurality of dimming regions DM1 to DM12. Twelve dimming regions DM1 to DM12 are exemplarily illustrated in FIG. 3A, but the number of the dimming regions according to the invention may not be limited to this example.

Referring to FIG. 3B, the backlight unit 600 may include a circuit board 610 and a plurality of light sources 620 mounted on the circuit board 610. The light sources 620 may be divided into a plurality of light source blocks LB1 to LB12. The light source blocks LB1 to LB12 may correspond to the dimming regions DM1 to DM12, respectively.

The number of dimming regions defined in the display panel 100 may vary depending on the number of the light source blocks. In an exemplary embodiment, for example, if the number of the light source blocks of the backlight unit 600 is 24, the display panel 100 may be divided into 24 dimming regions.

The light source blocks LB1 to LB12 of the backlight unit 600 may be provided below the display panel 100.

Each of the light source blocks LB1 to LB12 may include at least one light source 620. The light source 620 may be or include a light-emitting diode.

The display device DD, in which a local dimming method is used, may further include a dimming part 210, which is used to control a duty ratio or intensity of a driving signal to be applied to each of the light source blocks LB1 to LB12.

In some exemplary embodiments, the dimming part 210 may be included in the signal control unit 200, as shown in FIG. 2. In other exemplary embodiments, the dimming part 210 may be provided as a separate element that is independent of the signal control unit 200.

The dimming part 210 may be configured to receive the converted image data signal R'G'B', which will be transmitted to the data driving unit 400, and to generate dimming signals PWM1 to PWM12 based on the converted image data signal R'G'B'. In some exemplary embodiments, the dimming signals PWM1 to PWM12 may include first to twelfth dimming signals PWM1 to PWM12.

The first to twelfth dimming signals PWM1 to PWM12 may be provided to the light source driving unit 500. Based on the first to twelfth dimming signals PWM1 to PWM12, the light source driving unit 500 may control a duty ratio or intensity of each of first to twelfth driving signals DV1 to DV12, which are applied to the first to twelfth light source blocks LB1 to LB12, respectively. A method of determining the first to twelfth dimming signals PWM1 to PWM12 according to some exemplary embodiments of the inventive concept will be described in more detail with reference to FIGS. 8 and 9.

In the case where the local dimming method is used, by changing a duty ratio or intensity of each of the driving signals DV1 to DV12, which are applied to the light source blocks LB1 to LB12, respectively, it may be possible to control an amount of light to be emitted from each of the light source blocks LB1 to LB12. In the case where there is a change in the amount of light to be emitted from the light source blocks LB1 to LB12, luminance of the light to be emitted from the light source blocks LB1 to LB12 may be changed.

As a result, there may be a difference in luminance of light to be supplied to the dimming regions DM1 to DM12 of the display panel 100 from region to region.

Figure 4:
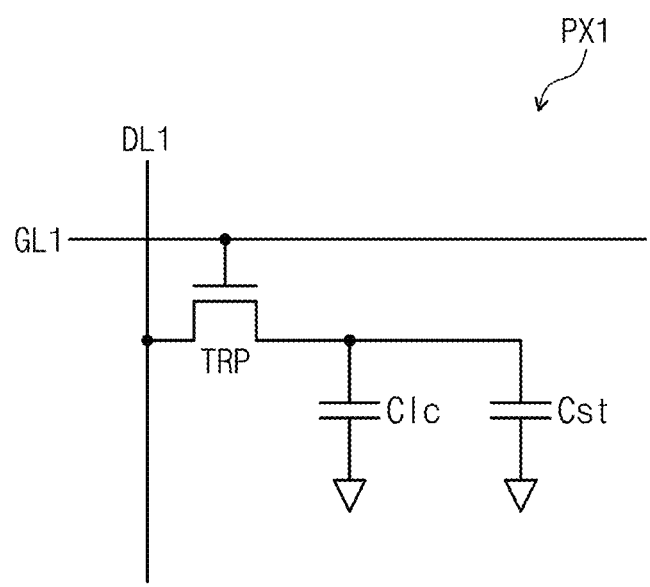
FIG. 4 is an equivalent circuit diagram of an exemplary embodiment of a pixel according to the inventive concept.
Figure 5:
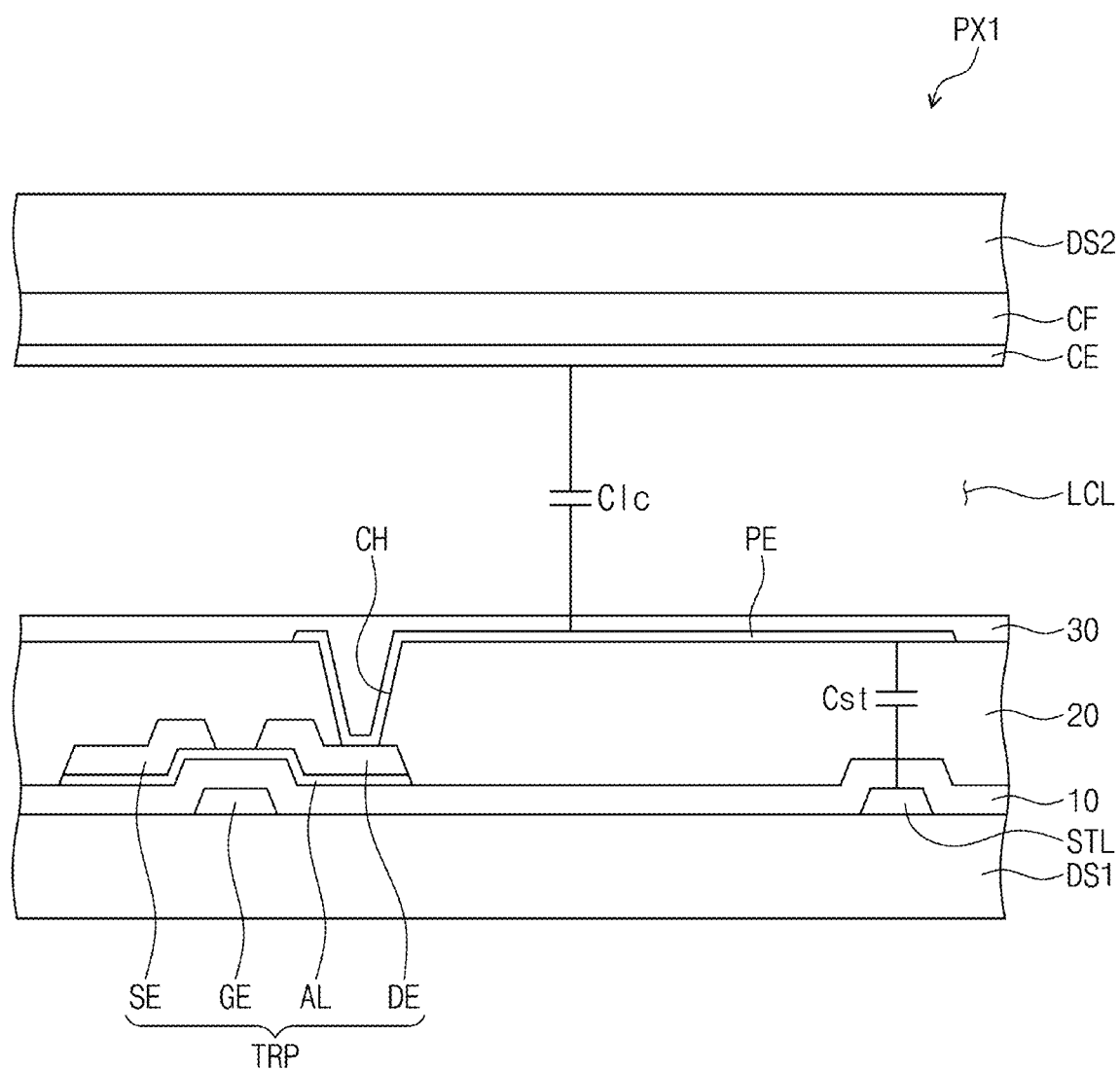
FIG. 5 is a sectional view of the pixel according to the inventive concept.

FIG. 4 is an equivalent circuit diagram illustrating an exemplary embodiment of the pixel PX1 according to the inventive concept. FIG. 5 is a sectional view of the pixel PX1 according to the inventive concept.

As shown in FIG. 4, the pixel PX1 may include a pixel thin-film transistor TRP (hereinafter, a pixel transistor), a liquid crystal capacitor Clc, and a storage capacitor Cst. In the specification, the term 'transistor' may refer to a thin-film transistor. In certain exemplary embodiments, the storage capacitor Cst may be omitted.

FIGS. 4 and 5 illustrate an example of the pixel transistor TRP that is electrically connected to the first gate line GL1 and the first data line DLL The pixel transistor TRP may output a pixel voltage, which corresponds to a data signal transmitted through the first data line DL1, in response to a gate signal transmitted through the first gate line GL1.

The liquid crystal capacitor Clc may be charged to the pixel voltage output from the pixel transistor TRP. An orientation of a liquid crystal director in a liquid crystal layer LCL (e.g., see FIG. 5) may be changed depending on an amount of electric charges stored in the liquid crystal capacitor Clc. Light to be incident into the liquid crystal layer LCL may be transmitted or blocked according to an orientation of the liquid crystal director.

The storage capacitor Cst and the liquid crystal capacitor Clc may be connected in parallel. The storage capacitor Cst may be configured to maintain an orientation of the liquid crystal director during a specific duration.

As shown in FIG. 5, the pixel transistor TRP may include a control electrode GE connected to the first gate line GL1 (e.g., see FIG. 4), an active layer AL overlapped with the control electrode GE, an input electrode SE connected to the first data line DL1 (e.g., see FIG. 4), and an output electrode DE spaced apart from the input electrode SE in a plan view.

The liquid crystal capacitor Clc may include a pixel electrode PE and a common electrode CE. The storage capacitor Cst may include the pixel electrode PE and a portion of a storage line STL, which is overlapped with the pixel electrode PE.

The first gate line GL1 and the storage line STL may be provided on a surface of a first substrate DS1. The control electrode GE may diverge from the first gate line GL1. In an exemplary embodiment, the first gate line GL1 and the storage line STL may be formed of or include at least one of metallic materials (e.g., aluminum (Al), silver (Ag), copper (Cu), molybdenum (Mo), chromium (Cr), tantalum (Ta), and titanium (Ti) or alloys thereof. The first gate line GL1 and the storage line STL may be provided to have a multi-layered structure including, for example, a titanium layer and a copper layer.

A first insulating layer 10 may be provided on the surface of the first substrate DS1 to cover the control electrode GE and the storage line STL. The first insulating layer 10 may be formed of or include at least one of inorganic and organic materials. The first insulating layer 10 may be an organic layer or an inorganic layer. In another exemplary embodiment, the first insulating layer 10 may be provided to have a multi-layered structure including, for example, a silicon nitride layer and a silicon oxide layer.

The active layer AL may be provided on the first insulating layer 10 to be overlapped with the control electrode GE. The active layer AL may include a semiconductor layer (not shown) and an ohmic contact layer (not shown).

The active layer AL may be formed of or include amorphous silicon or poly silicon. In certain exemplary embodiments, the active layer AL may be formed of or include a metal oxide semiconductor material.

The output electrode DE and the input electrode SE may be provided on the active layer AL. The output electrode DE and the input electrode SE may be spaced apart from each other. Each of the output electrode DE and the input electrode SE may be partially overlapped with the control electrode GE.

Although FIG. 5 illustrates an example in which the pixel transistor TRP is provided to have a staggered structure, the structure of the pixel transistor TRP according to the invention is not limited thereto. In an exemplary embodiment, for example, the pixel transistor TRP may be provided to have a planar structure.

A second insulating layer 20 may be provided on the first insulating layer 10 to cover the active layer AL, the output electrode DE, and the input electrode SE. The second insulating layer 20 may be provided to have a flat top surface. The second insulating layer 20 may be formed of or include an organic material.

The pixel electrode PE may be provided on the second insulating layer 20. The pixel electrode PE may be connected to the output electrode DE through a contact hole CH defined by the second insulating layer 20. An alignment layer 30 may be provided on the second insulating layer 20 to cover the pixel electrode PE.

A color filter layer CF may be provided on a surface of a second substrate DS2. The common electrode CE may be provided on a surface of the color filter layer CF. A common voltage may be applied to the common electrode CE. The common voltage may be different from the pixel voltage output from the pixel transistor TRP. An alignment layer (not shown) may be provided on the common electrode CE to cover the common electrode CE. In certain exemplary embodiments, another insulating layer may be provided between the color filter layer CF and the common electrode CE.

The pixel electrode PE and the common electrode CE may be spaced apart from each other with the liquid crystal layer LCL interposed therebetween, thereby forming the liquid crystal capacitor Clc. In addition, the pixel electrode PE and a portion of the storage line STL may be spaced apart from each other with the first and second insulating layers 10 and 20 interposed therebetween, thereby forming the storage capacitor Cst. The storage line STL may be applied with a storage voltage, which is different from the pixel voltage. The storage voltage may be substantially equal to the common voltage.

The vertical section of the pixel PX1 is not limited to that exemplarily shown in FIG. 5. Unlike that shown in FIG. 5, at least one of the color filter layer CF and the common electrode CE may be provided on the first substrate DS1. In certain exemplary embodiments, the display panel may be operated in one of a vertical alignment ("VA") mode, a patterned vertical alignment ("PVA") mode, an in-plane switching ("IPS") mode, or a fringe-field switching ("FFS") mode, and a plane-to-line switching ("PLS") mode.

Figure 6:
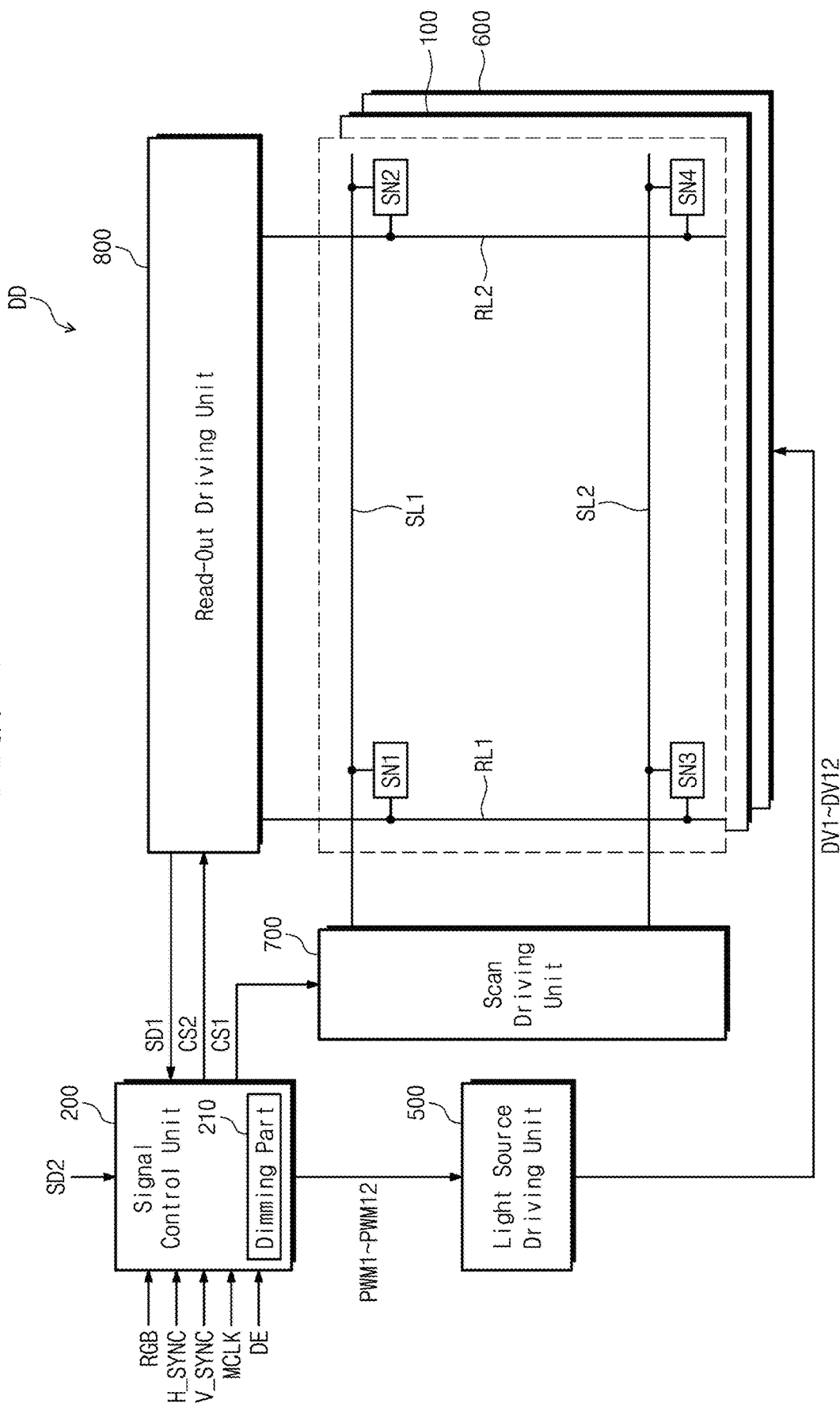
FIG. 6 is a block diagram illustrating an exemplary embodiment of sensors, which are provided in a display device, and driving units, which are provided to drive the sensors, according to the inventive concept.

FIG. 6 is a block diagram illustrating an exemplary embodiment of sensors SN1 to SN4, which are provided in the display device DD, and driving units 700 and 800, which are provided to drive the sensors SN1 to SN4, according to the inventive concept.

The sensors SN1 to SN4 may include a first sensor SN1, a second sensor SN2, a third sensor SN3, and a fourth sensor SN4. The first sensor SN1 may be provided at a position corresponding to a left top region of the display panel 100. The second sensor SN2 may be provided at a position corresponding to a right top region of the display panel 100. The third sensor SN3 may be provided at a position corresponding to a left bottom region of the display panel 100. The fourth sensor SN4 may be provided at a position corresponding to a right bottom region of the display panel 100. In the case where the sensors SN1 to SN4 are provided at positions corresponding to corners of the display panel 100, it may be possible to measure and predict a spatial variation in illuminance of an external light to be incident on the display panel 100 and thus to effectively improve a display quality of the display device DD.

However, the positions of the sensors SN1 to SN4 according to the invention are not limited to the above example and may be variously changed. FIG. 6 illustrates an example in which four sensors SN1 to SN4 are provided, but the inventive concept is not limited thereto. That is, the number of the sensors may be larger than 1.

Each of the sensors SN1 to SN4 may be connected to scan lines SL1 and SL2 and read-out lines RL1 and RL2. FIG. 6 illustrates an example in which two scan lines SL1 and SL2 and two read-out lines RL1 and RL2 are provided, but the numbers of the scan and read-out lines according to the invention may be changed depending on the number of the sensors.

The scan lines SL1 and SL2 may be connected to a scan driving unit 700, and the read-out lines RL1 and RL2 may be connected to a read-out driving unit 800. An operation of the scan driving unit 700 may be controlled by a first control signal CS1 provided from the signal control unit 200, and an operation of the read-out driving unit 800 may be controlled by a second control signal CS2 provided from the signal control unit 200.

The scan driving unit 700 may be configured to provide scan signals, which are used to drive the sensors SN1 to SN4, to the scan lines SL1 and SL2. Each of the sensors SN1, SN2, SN3, and SN4 may be configured to measure illuminance of an external light, in response to the scan signals provided from the scan lines SL1 and SL2, and to provide electrical signals corresponding thereto (e.g., signals containing illuminance data) to the read-out lines RL1 and RL2. The read-out lines RL1 and RL2 may be configured to transmit signals, which are output from the sensors SN1 to SN4, to the read-out driving unit 800.

The read-out driving unit 800 may be configured to provide first external light map signals SD1 to the signal control unit 200, based on the transmitted signals. The first external light map signals SD1 may be prepared to contain information on illuminance of an external light obtained by the sensors SN1 to SN4.

The signal control unit 200 may be configured to further receive second external light map signals SD2. Referring to FIG. 6, the second external light map signals SD2 may be signals, which may be generated by the device RC (e.g., a remote controller) near the user HM. The second external light map signals SD2 may be prepared to contain information on illuminance of an external light obtained by the device RC.

In some exemplary embodiments, the scan driving unit 700 may be substantially the same circuit as the gate driving unit 300. In some exemplary embodiments, the read-out driving unit 800 may be substantially the same circuit as the data driving unit 400.

Figure 7A:
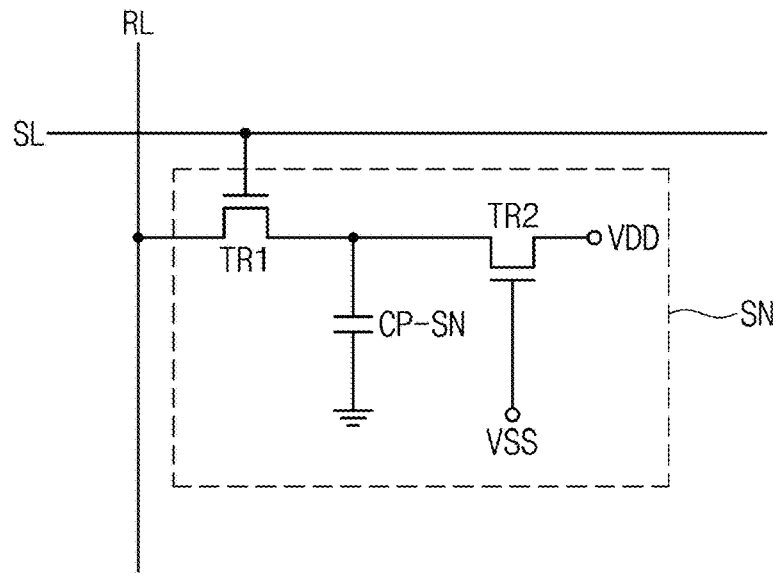
FIGS. 7A, 7B, and 7C are exemplary embodiments of equivalent circuit diagrams of sensors according to the inventive concept.
Figure 7B:
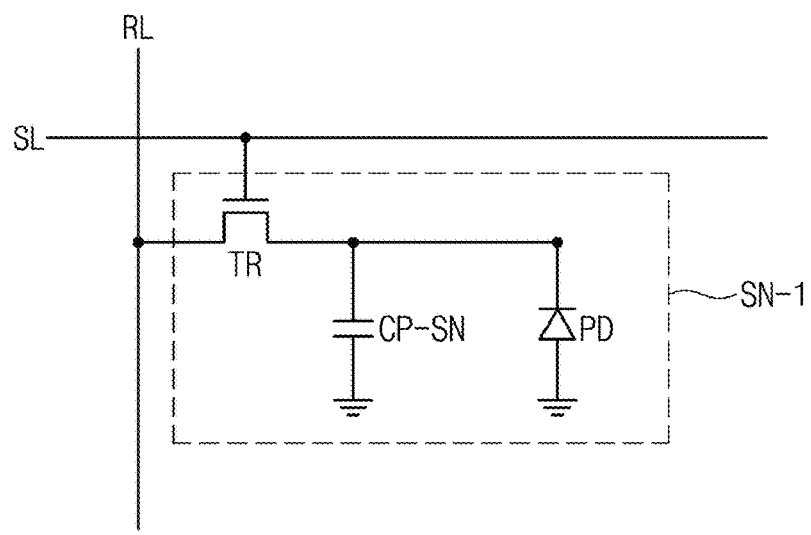
Figure 7C:
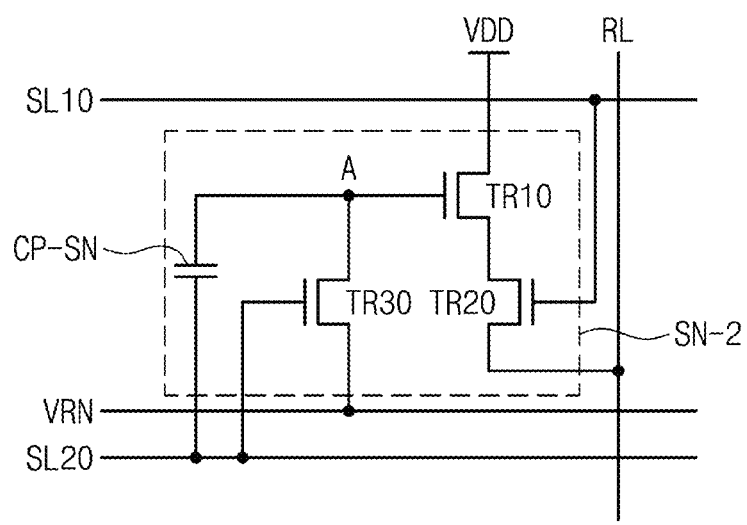

FIGS. 7A, 7B, and 7C are equivalent circuit diagrams illustrating exemplary embodiments of sensors SN, SN-1, and SN-2 according to the inventive concept.

FIG. 7A shows an example of a sensor SN that is connected to one of scan lines SL and one of read-out lines RL. The structure of the sensor SN may be variously changed, without being limited to the example shown in FIG. 7A.

The sensor SN may include a first transistor TR1, a second transistor TR2, and a sensing capacitor CP-SN.

The first transistor TR1 may be used as a switching device and may include a control electrode, an output electrode, and an input electrode, which are connected to the scan line SL, the read-out line RL, and the sensing capacitor CP-SN, respectively. The second transistor TR2 may include an input electrode, an output electrode, and a control electrode, which are connected to the input voltage line VDD, the sensing capacitor CP-SN, and the common voltage line VSS, respectively.

If an external light is incident on the second transistor TR2, a current flowing through a channel region, which includes amorphous silicon or poly silicon, of the second transistor TR2 may be produced, and due to an input voltage provided from the input voltage line VDD, the current may flow toward the sensing capacitor CP-SN and the first transistor TR1. In other words, the second transistor TR2 may be configured to serve as a phototransistor. The phototransistor, which is one of photo-sensors converting light energy to electric energy, may be configured to use a photoelectro-motive force effect that an amount of the current is changed depending on an intensity of the incident light. In certain exemplary embodiments, the phototransistor may also be configured to amplify photocurrent produced in this process.

FIG. 7B shows an example of a sensor SN-1 that is connected to one of the scan lines SL and one of the read-out lines RL. The structure of the sensor SN-1 may be variously changed, without being limited to the example shown in FIG. 7B.

The sensor SN-1 may include a transistor TR, a sensing capacitor CP-SN, and a photodiode PD.

The photodiode PD may be configured to replace the second transistor TR2 of FIG. 7A and to have the same function as the second transistor TR2 of FIG. 7A. Due to inherent characteristics in structure and operation of the photodiode PD, the equivalent circuit of the sensor SN-1 may be different from the equivalent circuit of the sensor SN of FIG. 7A.

Since the photodiode PD does not have a current-amplifying function, the photodiode PD may have lower sensitivity to light but a faster reaction speed in comparison with the phototransistor.

FIG. 7C shows an example of a sensor SN-2 that is connected to two scan lines SL10 and SL20 and one of the read-out lines RL. The structure of the sensor SN-2 may be variously changed, without being limited to the example shown in FIG. 7C.

The sensor SN-2 may include a first transistor TR10, a second transistor TR20, a third transistor TR30, and a sensing capacitor CP-SN. Here, the third transistor TR30 may be a phototransistor. In certain exemplary embodiments, the third transistor TR30 may be replaced with a photodiode.

An input electrode of the first transistor TR10 may be connected to the input voltage line VDD, an output electrode of the first transistor TR10 may be connected to an input electrode of the second transistor TR20, and a control electrode of the first transistor TR10 may be connected to an output electrode of the third transistor TR30 and the sensing capacitor CP-SN.

The input electrode of the second transistor TR20 may be connected to the output electrode of the first transistor TR10, the output electrode of the second transistor TR20 may be connected to the read-out line RL, and the control electrode of the second transistor TR20 may be connected to the first scan line SL10.

An input electrode of the third transistor TR30 may be connected to a reset voltage line VRN, an output electrode of the third transistor TR30 may be connected to the control electrode of the first transistor TR10 and the sensing capacitor CP-SN, and a control electrode of the third transistor TR30 may be connected to the second scan line SL20.

If a scan signal is applied to the second scan line SL20, the third transistor TR30 may be turned on, and thus, a node A may be reset by a voltage applied to the reset voltage line VRN. If light is incident on the third transistor TR30, there may be a current flowing through the third transistor TR30, and this may allow the node A to have a different voltage from the reset voltage. Accordingly, a current flowing through the first transistor TR10 may be changed depending on the voltage of the node A. Thereafter, if a scan signal is applied to the first scan line SL10, the second transistor TR20 may be turned on to provide a current path to the read-out line RL. In this case, by measuring an amount of current provided to the read-out driving unit 800 through the read-out line RL, it may be possible to measure an intensity of the incident light.

Figure 8:
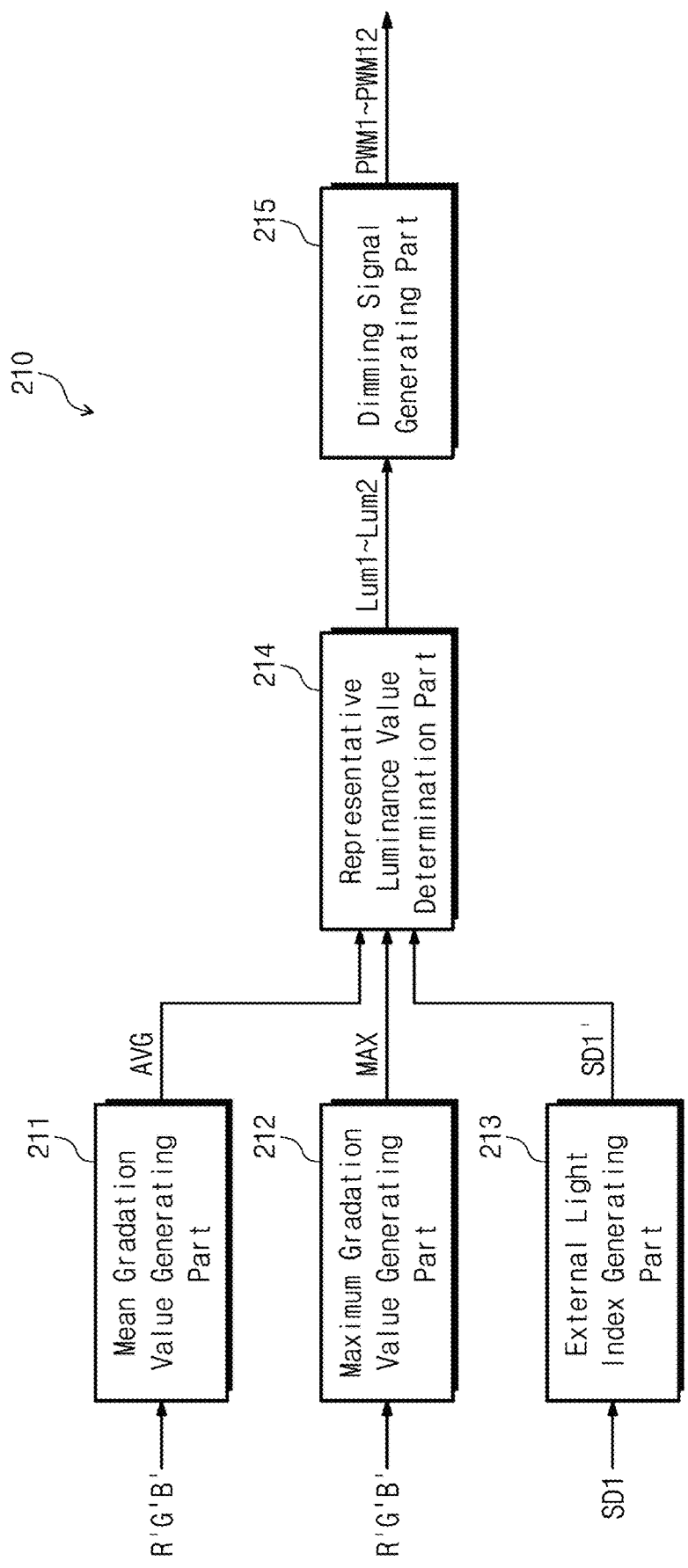
FIGS. 8 and 9 are block diagrams illustrating exemplary embodiments of dimming parts according to the inventive concept.
Figure 9:
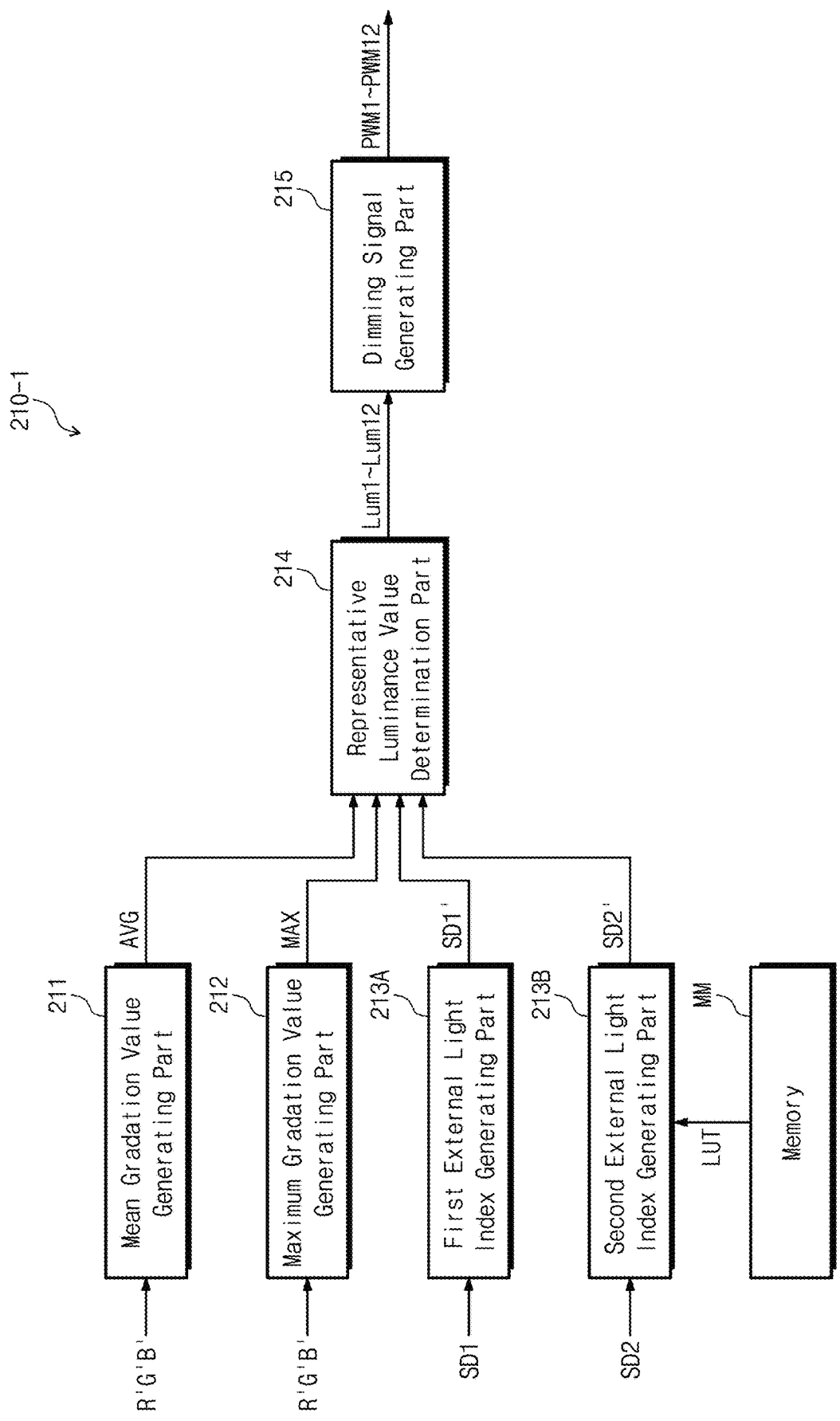

FIGS. 8 and 9 are block diagrams illustrating exemplary embodiments of dimming parts 210 and 210-1 according to the inventive concept.

Referring to FIG. 8, the dimming part 210 may include a mean gradation value generating part 211, a maximum gradation value generating part 212, an external light index generating part 213, a representative luminance value determination part 214, and a dimming signal generating part 215.

The mean gradation value generating part 211 may be configured to receive the converted image data signal R'G'B' from the signal control unit 200 and to divide the converted image data signal R'G'B' into image signal groups corresponding to the dimming regions DM1-DM12, respectively (e.g., see FIG. 3A). The mean gradation value generating part 211 may also be configured to obtain gradation values from each of the image signal groups and to obtain mean values, each of which is given for a corresponding one of the image signal groups, from the gradation values. The mean values may be output as mean gradation values AVG for the dimming regions DM1-DM12 (e.g., see FIG. 3A), respectively.

The maximum gradation value generating part 212 may be configured to receive the converted image data signal R'G'B' from the signal control unit 200 and to divide the converted image data signal R'G'B' into image signal groups corresponding to the dimming regions DM1-DM12, respectively (e.g., see FIG. 3A). The maximum gradation value generating part 212 may also be configured to obtain gradation values from each of the image signal groups and to obtain maximum values, each of which is given for a corresponding one of the image signal groups, from the gradation values. The maximum values may be output as maximum gradation values MAX for the dimming regions DM1-DM12 (e.g., see FIG. 3A), respectively.

The external light index generating part 213 may generate first external light indices SD1' from the first external light map signals SD1, which are obtained by the sensors SN1 to SN4.

The representative luminance value determination part 214 may generate first to twelfth representative luminance values Lum1 to Lum12 which correspond to the first to twelfth dimming regions DM1 to DM12 (e.g., see FIG. 3A), respectively. The first to twelfth representative luminance values Lum1 to Lum12 may be calculated from the mean gradation values AVG, the maximum gradation values MAX, and the first external light indices SD1'.

In detail, the first to twelfth representative luminance values Lum1 to Lum12 may be calculated by the following formula 1.

$$\overline{Lum} = \overline{A} - \overline{B}, \text{ where} \qquad [\text{Formula 1}]$$

$$\overline{A} = \alpha \times \text{MAX} + (1 - \alpha) \times AVG \text{ and}$$

$$B = FullGray \times$$

$$\left\{ \left( \frac{L_{MeanGray} + \left( \frac{\text{Positional illuminance}}{\text{Reference illuminance}} \times \text{Reflectance} \right)}{L_{FullGray}} \right)^{1/2.2} \right.$$

$$\left. - \left( \frac{L_{MeanGray}}{L_{FullGray}} \right)^{1/2.2} \right\}$$

Here, AVG is a mean gradation value of each of the dimming regions DM1 to DM12 (e.g., see FIG. 3A), MAX is a maximum gradation value of each of the dimming regions DM1 to DM12 (e.g., see FIG. 3A). $\overline{\alpha}$ is a number that is greater than 0 and smaller than 1. A positional illuminance is given by the first external light index SD1'. $\overline{L_{MeanGray}}$ is a mean luminance value, and $\overline{L_{FullGray}}$ is a maximum luminance value. The reflectance is an arbitrary parameter that is introduced in consideration of an increase in luminance of a panel caused by an external light and has a dimension of nit(cd/m$^2$). For example, the reflectance may be 2 nit. The reference illuminance may be, for example, 500 lux.

If the first to twelfth representative luminance values Lum1 to Lum12 for the first to twelfth dimming regions DM1 to DM12 are obtained by the above process, the first to twelfth representative luminance values Lum1 to Lum12 may be provided to the dimming signal generating part 215.

The dimming signal generating part 215 may be configured to generate the first to twelfth dimming signals PWM1 to PWM12, based on the first to twelfth representative luminance values Lum1 to Lum12. The first to twelfth dimming signals PWM1 to PWM12 may be used to control duty ratios of light sources, which are respectively included in the first to twelfth dimming regions DM1 to DM12.

The light source driving unit 500 (e.g., see FIGS. 2 and 6) may be configured to generate first to twelfth driving signals DV1 to DV12. The first to twelfth driving signals DV1 to DV12 may be used to control a duty ratio of each of the first to twelfth light source blocks LB1 to LB12, according to the first to twelfth dimming signals PWM1 to PWM12.

In some exemplary embodiments, a bright representative luminance value for displaying a bright image and a dark representative luminance value for displaying a dark image may be obtained by different formulas. A criterion for differentiation between the bright and dark images may be variously changed.

In some exemplary embodiments, the bright representative luminance value may be calculated using the formula 1, whereas the dark representative luminance value may be calculated by the following formula 2.

$$\overline{Lum} = \frac{A}{2^{2.2}} \quad \text{[Formula 2]}$$

In the formula 2, A is the same as that in the formula 1.

In the case where the dark representative luminance value is calculated using the formula 2 and is used to generate the dimming signal and the driving signal, luminance of light emitted from a light source block may be lowered, compared to the general case. Thus, in this case, a gamma value ($\Gamma$), which is used to determine a gamma voltage to be generated from the gamma voltage generating part, may be calculated by the following formula 3.

$$\overline{\Gamma} = (2 \times \overline{Gray})^{2.2}, \quad \text{[Formula 3]}$$

where $\overline{Gray}$ is a gradation value.

The reduction of the luminance of light emitted from the light source block (i.e., by the formula 2) may be compensated by an increase of the gamma value (i.e., by the formula 3).

Referring to FIG. 1, if an external light is incident on the display device DD, a yellowish phenomenon may occur. If the yellowish phenomenon occurs, the user HM feels that the image IM is yellower than its original color.

A method of emphasizing blue-color signals among the image data signals may be used to compensate for the yellowish phenomenon.

A value V_Blue for the emphasized blue-color signal may be calculated by the following formula 4.

$$\text{V\_Blue} = \text{Image source} + C \text{ where} \quad \text{[Formula 4]}$$

$$C = FullGray \times \left\{ \left( \frac{L_{MeanGray} + \left( \frac{\text{Positional illuminance}}{\text{Reference illuminance}} \times \text{Reflectance} \times 0.89 \right)}{L_{FullGray}} \right)^{1/2.2} - \left( \frac{L_{MeanGray}}{L_{FullGray}} \right)^{1/2.2} \right\}$$

For example, the reflectance may be 2 nit.

Referring to FIG. 9, a dimming part 210-1 may include the mean gradation value generating part 211, the maximum gradation value generating part 212, a first external light index generating part 213A, a second external light index generating part 213B, the representative luminance value determination part 214, and the dimming signal generating part 215.

The mean gradation value generating part 211 and the maximum gradation value generating part 212 may be configured to have substantially the same features as those described with reference to FIG. 8, and thus, a detailed description thereof will be omitted. The first external light index generating part 213A may be configured to have substantially the same features as the external light index generating part 213 described with reference to FIG. 8, and thus, a detailed description thereof will be omitted.

The second the external light index generating part 213B may be configured to generate a second external light index SD2' from the second external light map signals SD2, which are transmitted from the device RC (e.g., a remote controller) near the user HM.

The second external light index SD2' may be determined, based on a lookup table stored in a memory. The lookup table may be prepared to contain information on a variation in a pupil size of a human eye, which is caused by a change in peripheral illuminance.

For example, the lookup table may be prepared to contain data given by the following table 1 or 2. Table 1 contains data of pupil sizes measured by a pupil card, and Table 2 contains data of pupil sizes measured by a pupillometer.

TABLE 1

| Techniques | Luminance | Pupil size (mm) |
|---|---|---|
| Pupil Card | Photopic | 4.14 |
|  | Mesopic | 5.35 |
|  | Scotopic | 5.72 |

TABLE 2

| Techniques | Luminance | Pupil size (mm) |
|---|---|---|
| Pupillometer | Photopic | 4.25 |
|  | Mesopic | 5.37 |
|  | Scotopic | 5.70 |

The memory may be included in the dimming part 210. However, the inventive concept is not limited thereto, and in certain exemplary embodiments, the memory may be a separate element that is not included in the dimming part 210.

The first to twelfth representative luminance values Lum1 to Lum12, which are generated by the representative luminance value determination part 214, may be calculated from the mean gradation values AVG, the maximum gradation values MAX, the first external light indices SD1', and the second external light indices SD2'.

In detail, the first to twelfth representative luminance values Lum1 to Lum12 may be calculated by the following formula 5.

$$\overline{Lum} = A - B \times D \text{ where} \quad \text{[Formula 5]}$$

$$D = \frac{\text{Pupil size in standard state}}{\text{Pupil size of user}}.$$

Variables A and B in the formula 5 are the same as those in the formula 1. The pupil size in standard state is a mean value of pupil sizes of people in a typical indoor lighting environment and is, for example, about 4.25 mm. The pupil size of user may be determined by the second external light index SD2'.

The dimming signal generating part 215 may be configured to have substantially the same features as that of FIG. 8, and thus, a detailed description thereof will be omitted.

Figure 10A:
FIG. 10A shows an example of an image displayed on a display device according to the inventive concept.
Figure 10B:
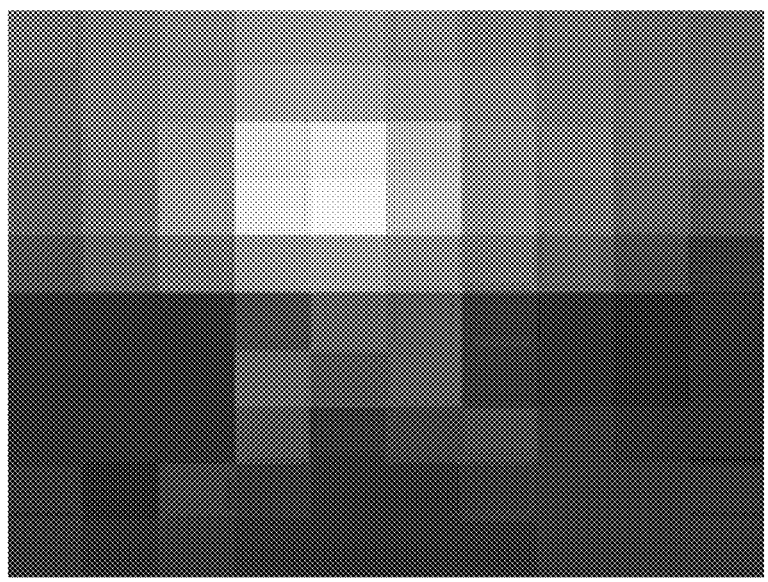
FIG. 10B illustrates an exemplary embodiment of a local dimming operation, which is performed using converted image data signals in a display device, according to the inventive concept.
Figure 10C:
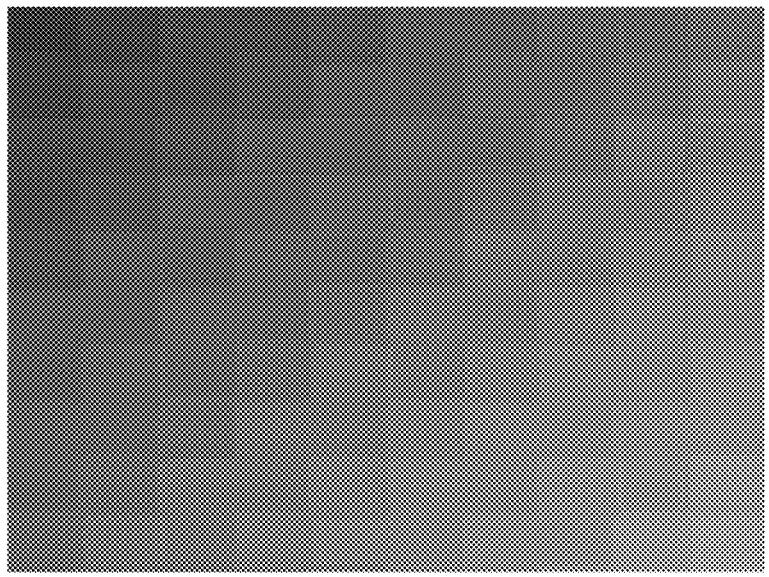
FIG. 10C is an exemplary external light map showing how each portion of a display device is affected by an external light.
Figure 10D:
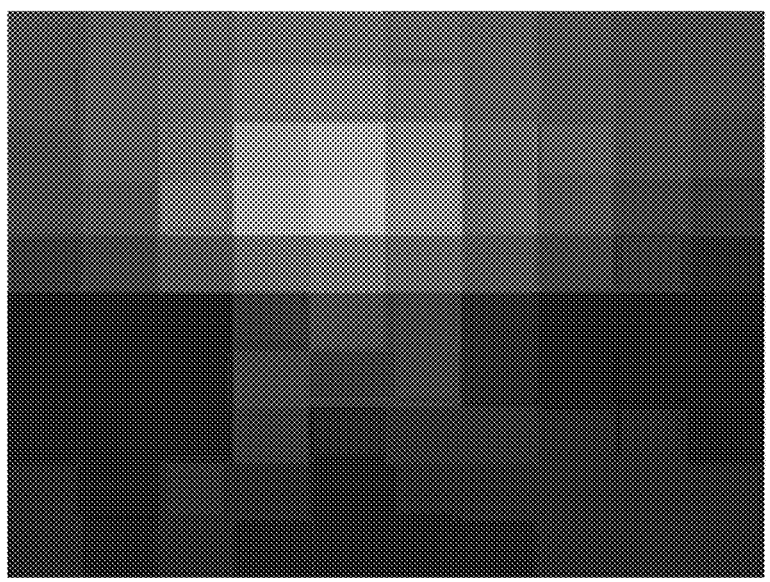
FIG. 10D illustrates an exemplary embodiment of a local dimming operation, which is performed using converted image data signals and an external light map in a display device, according to the inventive concept.

FIG. 10A shows an example of an image displayed on the display device DD according to the inventive concept. FIG. 10B illustrates an exemplary embodiment of a local dimming operation, which is performed using the converted image data signals R'G'B' in the display device DD, according to the inventive concept. FIG. 10C is an exemplary external light map showing how each portion of the display device DD is affected by an external light. FIG. 10D illustrates an exemplary embodiment of a local dimming operation, which is performed using the converted image data signals R'G'B' and an external light map in the display device DD, according to the inventive concept.

Referring to FIGS. 3B, 6, 8, and 9, the four sensors SN1 to SN4 may be used to obtain the first external light map signals SD1 or the first external light indices SD1' corresponding to twelve light source blocks LB1 to LB12. Here, the first external light map signals SD1 or the first external light indices SD1', which correspond to light source blocks LB1, LB4, LB9, and LB12 provided at the four corners of the backlight unit 600, may be directly obtained from illuminance values that are measured by the four sensors SN1 to SN4. The first external light map signals SD1 or the first external light indices SD1', which correspond to the remaining light source blocks LB2, LB3, LB5, LB6, LB7, LB8, LB10, and LB11, may be indirectly obtained by interpolating the values of the first external light map signals SD1 or the first external light indices SD1' that are directly obtained as above.

As an example, for the dimming regions DM1, DM2, DM3, and DM4 defined in a top region of the display panel 100, the light source blocks LB1, LB2, LB3, and LB4 may be used to provide light to the dimming regions DM1, DM2, DM3, and DM4, respectively. In this case, some of the first external light map signals SD1 or the first external light indices SD1' corresponding to the light source blocks LB2 and LB3 may be incrementally changed by an increment given in proportion to a difference between illuminances measured by the first and second sensors SN1 and SN2.

In more detail, suppose that, based on the illuminance measured by the first sensor SN1, a level of the first external light map signal SD1 or the first external light index SD1' corresponding to the first light source block LB1 provided at the leftmost top region of the display panel 100 is given as 10. In addition, suppose that, based on illuminance measured by the second sensor SN2, a level of the first external light map signal SD1 or the first external light index SD1' corresponding to the fourth light source block LB4 provided at the rightmost top region of the display panel 100 is given as 16. In this case, a level of the first external light map signal SD1 or the first external light index SD1' corresponding to the second light source block LB2 may be given as 12, and a level of the first external light map signal SD1 or the first external light index SD1' corresponding to the third light source block LB3 may be given as 14. Accordingly, levels of the first external light map signals SD1 or the first external light indices SD1' corresponding to the first to fourth light source blocks LB1 to LB4 may be sequentially and incrementally changed from 10 to 16.

The above method, which is used to obtain the first external light map signals SD1 or the first external light indices SD1', may be applied to all of the light source blocks LB1 to LB12.

In certain exemplary embodiments, the display device DD may include a plurality of sensors SN corresponding to a plurality of light source blocks, respectively. In this case, the number of the sensors may increase, and thus, cost and complexity in the fabrication process may also increase. However, it may be possible to more precisely measure illuminance of an external light.

One hundred (i.e., 10×10) dimming regions and one hundred light source blocks are illustrated in FIGS. 10A to 10D.

When an image shown in FIG. 10A is displayed, only the converted image data signals R'G'B' may be used in a local dimming operation, which is performed using the mean gradation value generating part 211 and the maximum gradation value generating part 212. In this case, each of light source blocks may be configured to emit light whose gradation level is given based on a basic dimming map shown in FIG. 10B.

The external light map shown in FIG. 10C shows that influence of the external light is greater on a right bottom region of the external light map than on other regions. According to some exemplary embodiments of the inventive concept, the display device DD may perform the afore-described local dimming operation. In an exemplary embodiment, for example, each of the light source blocks may be configured to emit light whose gradation level is given based on a corrected dimming map shown in FIG. 10D. In the corrected dimming map of FIG. 10D, the gradation level at the right bottom region may be lowered, compared with the basic dimming map shown in FIG. 10B.

Figure 11:
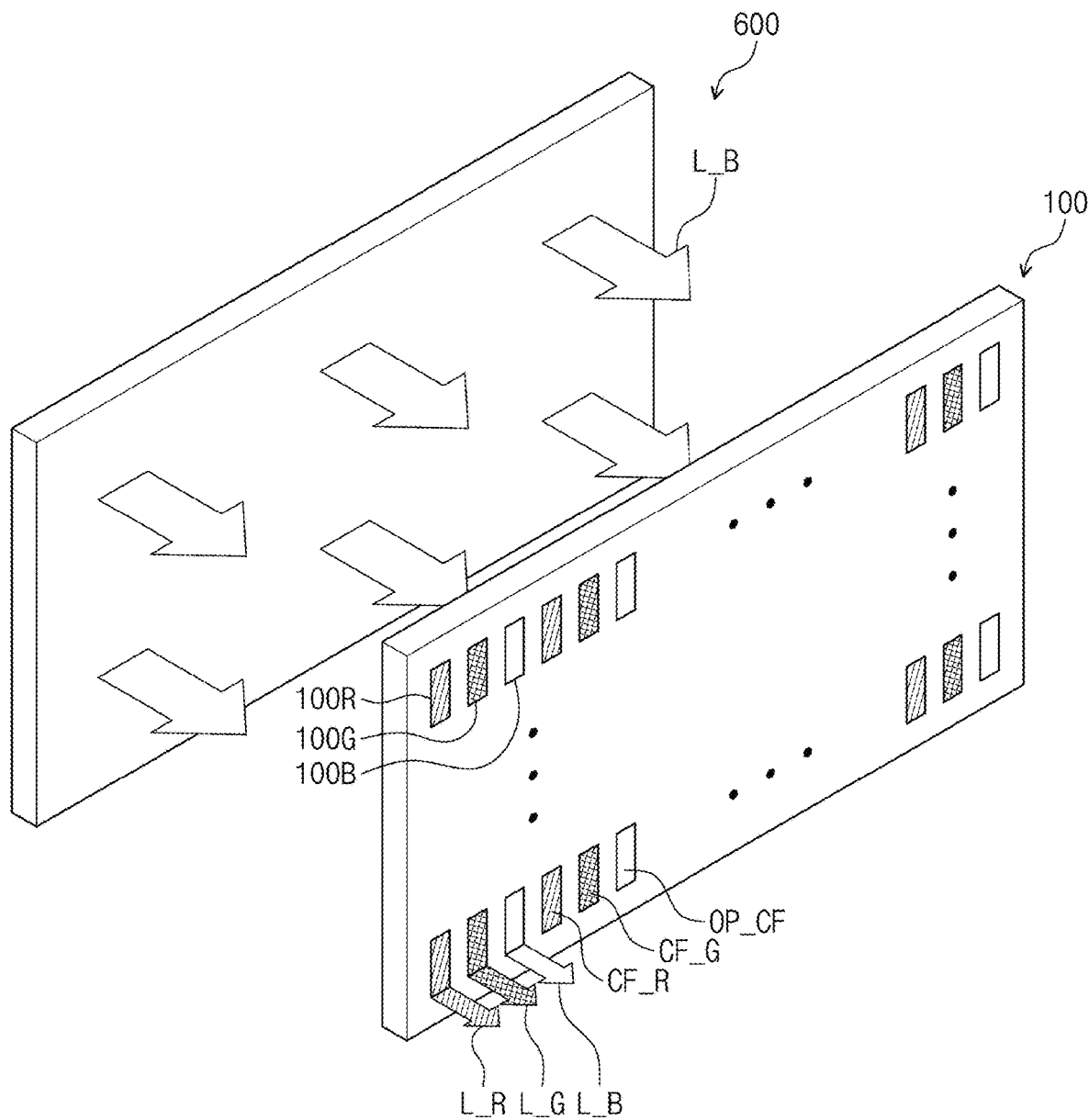
FIG. 11 illustrates an exemplary embodiment of a display panel and a backlight unit, according to the inventive concept.

FIG. 11 exemplarily illustrates an exemplary embodiment of the display panel 100 and the backlight unit 600, according to the inventive concept.

In some exemplary embodiments, the backlight unit 600 may be configured to emit a blue color light L_B.

The display panel 100 may include the color filter layer CF (e.g., see FIG. 5), which is provided at a front side thereof and includes a red coloring part 100R, a green coloring part 100G, and a blue coloring part 100B. The red coloring part 100R may include a red color filter CF_R and may be configured to emit a red color light L_R. The green coloring part 100G may include a green color filter CF_G and may be configured to emit a green color light L_G. An opening OP_CF may be defined in the blue coloring part 100B, and the blue color light L_B emitted from the backlight unit 600 may pass through the opening OP_CF.

However, the inventive concept is not limited thereto, and in certain exemplary embodiments, the backlight unit 600 may be configured to emit a white light, and the color filter layer CF (e.g., see FIG. 5) may include a red color filter, a green color filter, and a blue color filter.

According to some exemplary embodiments of the inventive concept, provided is a display device that is configured to perform a local dimming operation. By using the local dimming operation, it may be possible to display a high-quality image, even when an external light is incident on a display device.

According to some exemplary embodiments of the inventive concept, provided is a display device that is configured to perform a local dimming operation. By using the local dimming operation, it may be possible to display a high-quality image, even when there is a change in illumination environment around a user.

While example exemplary embodiments of the inventive concepts have been particularly shown and described, it will be understood by one of ordinary skill in the art that variations in form and detail may be made therein without departing from the spirit and scope of the attached claims.

What is claimed is:

1. A display device, comprising:
   a display panel in which a plurality of dimming regions is defined;
   a plurality of sensors at different positions, each of which measures illuminance of an external light incident on the display panel;
   a signal control unit which determines a plurality of representative luminance values corresponding to the plurality of dimming regions based on image data signals transmitted from an external device and external light map signals generated based on the measured illuminance of the external light, and generates a plurality of dimming signals corresponding to the plurality of representative luminance values;
   a light source driving unit which receives the plurality of dimming signals and outputs a plurality of driving signals corresponding to the plurality of dimming signals received; and
   a backlight unit which receives the plurality of driving signals and comprises a plurality of light source blocks which provides lights having the corresponding representative luminance values to the plurality of dimming regions,
   wherein the plurality of sensors comprise a first sensor disposed at a position corresponding to a left side region of the display panel, a second sensor disposed at a position corresponding to a right side region of the display panel, and
   a value of the external light map signal, which is used to determine the representative luminance value corresponding to the dimming region defined in a first region of the display panel, is determined based on a relative position of the corresponding dimming region with respect to the positions of the first and second sensors such that the value changes in proportion to a difference between illuminances measured by the first sensor and second sensor.

2. The display device of claim 1, wherein the plurality of sensors further comprise a third sensor disposed at a position corresponding to a left bottom region of the display panel, and a fourth sensor disposed at a position corresponding to a right bottom region of the display panel,
   the first sensor disposed at a position corresponding to a left top region of the display panel, and
   the second sensor disposed at a position corresponding to a right top region of the display panel.

3. The display device of claim 2, wherein
   a value of the external light map signal, which is used to determine the representative luminance value corresponding to the dimming region defined in a second region of the display panel, is determined based on a relative position of the corresponding dimming region with respect to the positions of the third and fourth sensors such that the value changes in proportion to a difference between illuminances measured by the third sensor and fourth sensor.

4. The display device of claim 3, wherein a value of the external light map signal, which is used to determine the representative luminance value corresponding to the dimming region defined in a third region of the display panel, is determined based on a relative position of the corresponding dimming region with respect to the positions of the first and third sensors such that the value changes in proportion to a difference between illuminances measured by the first sensor and third sensor, and
   a value of the external light map signal, which is used to determine the representative luminance value corresponding to the dimming region defined in a fourth region of the display panel, is determined based on a relative position of the corresponding dimming region with respect to the positions of the second and fourth sensors such that the value changes in proportion to a difference between illuminances measured by the second sensor and fourth sensor.

5. The display device of claim 4, wherein the first region, the second region, the third region and the fourth region are a top region, a bottom region, a left region and a right region of the display panel, respectively.

6. The display device of claim 1, wherein the plurality of sensors is disposed to correspond to the plurality of light source blocks, respectively, and
   each of the external light map signals is changed depending on illuminance of the external light measured by a corresponding one of the plurality of sensors.

7. The display device of claim 1, wherein, when a gradation value obtained from the image data signals is less than a predetermined value, the signal control unit further determines sub-representative luminance values based only on the received image data signals, and each of the sub-representative luminance values is determined to be smaller than the representative luminance values.

8. The display device of claim 7, wherein, when a gradation value obtained from the image data signals is less than the predetermined value, the signal control unit increases a gamma value of the received image data signal.

9. The display device of claim 1, wherein, when a gradation value obtained from the image data signals is less than a predetermined value, the signal control unit emphasizes blue-color signals in the image data signals.

10. The display device of claim 1, further comprising a memory which stores a lookup table containing information regarding a change in pupil size of a human eye which occurs when there is a change in illuminance.

11. The display device of claim 10, wherein the display device receives a user illuminance signal, in which information on neighboring illuminance is contained, from an external device around a user, obtains a pupil size value corresponding to the received user illuminance signal from the lookup table in the memory, and determines the representative luminance value based on the obtained pupil size value.

12. The display device of claim 11, wherein the external device is a remote controller with a sensor, and the sensor of the remote controller measures illuminance of light incident thereon.

13. The display device of claim 1, wherein the display panel comprises a plurality of pixels, and the plurality of sensors is disposed on the display panel to be adjacent to some of the plurality of pixels.

14. The display device of claim 1, wherein the backlight unit provides blue color lights to the display panel, and
   the display panel further comprises a color filter layer on which the blue color lights provided from the backlight unit are incident.

15. The display device of claim 14, wherein the color filter layer comprises a red coloring part including a red color filter, a green coloring part including a green color filter, and a blue coloring part in which an opening is defined.

16. A display device, comprising:
a display panel which includes a plurality of pixels;
a plurality of sensors provided adjacent to the display panel and which measures illuminance of an external light incident thereon and outputs illuminance data signals;
a signal control unit which extracts a plurality of gradation values from image data signals received by an external device, extracts external light indices from the illuminance data signals, calculates representative luminance values, and generates a plurality of dimming signals corresponding to the representative luminance values, each of the representative luminance values being obtained based on mean and maximum values of the extracted gradation values and the extracted external light indices; and
a backlight unit which includes a plurality of light source blocks, receives a plurality of driving signals corresponding to the plurality of dimming signals, and provides light to the display panel, wherein each of the light source blocks emits light having a corresponding one of the plurality of representative luminance values.

17. The display device of claim 16, wherein the plurality of sensors comprises a first sensor disposed adjacent to a left top region of the display panel, a second sensor disposed adjacent to a right top region of the display panel, a third sensor disposed adjacent to a left bottom region of the display panel, and a fourth sensor disposed adjacent to a right bottom region of the display panel.

18. The display device of claim 17, wherein the external light index, which is used to calculate the representative luminance value corresponding to the light source block providing light to a top region of the display panel, is determined based on a relative position of the corresponding dimming region with respect to the positions of the first and second sensors such that the value changes in proportion to a difference between illuminances measured by the first and second sensors, and the external light index, which is used to calculate the representative luminance value corresponding to the light source block providing light to a bottom region of the display panel, is determined based on a relative position of the corresponding dimming region with respect to the positions of the third and fourth sensors such that the value changes in proportion to a difference between illuminances measured by the third and fourth sensors.

19. The display device of claim 18, wherein the external light index, which is used to calculate the representative luminance value corresponding to the light source block providing light to a left region of the display panel, is determined based on a relative position of the corresponding dimming region with respect to the positions of the first and third sensors such that the value changes in proportion to a difference between illuminances measured by the first and third sensors, and the external light index, which is used to calculate the representative luminance value corresponding to the light source block providing light to a right region of the display panel, is determined based on a relative position of the corresponding dimming region with respect to the positions of the second and fourth sensors such that the value changes in proportion to a difference between illuminances measured by the second and fourth sensors.

20. The display device of claim 16, wherein the plurality of sensors is disposed to correspond to the plurality of light source blocks, respectively.

* * * * *